(12) United States Patent
Siegl

(10) Patent No.: US 8,486,325 B2
(45) Date of Patent: Jul. 16, 2013

(54) PARISON AND METHOD FOR THE PRODUCTION OF PLASTIC BOTTLES

(75) Inventor: Robert Siegl, Dornbirn (AT)

(73) Assignee: Alpla Werke Alwin Lehner GmbH & Co. Kg (AT)

( * ) Notice: Subject to any disclaimer, the term of this patent is extended or adjusted under 35 U.S.C. 154(b) by 1154 days.

(21) Appl. No.: 12/441,511

(22) PCT Filed: Sep. 15, 2006

(86) PCT No.: PCT/EP2006/008990
§ 371 (c)(1),
(2), (4) Date: Mar. 16, 2009

(87) PCT Pub. No.: WO2008/031447
PCT Pub. Date: Mar. 20, 2008

(65) Prior Publication Data
US 2009/0266785 A1    Oct. 29, 2009

(51) Int. Cl.
*B29C 49/08* (2006.01)

(52) U.S. Cl.
USPC .............................. 264/532; 264/523; 264/537

(58) Field of Classification Search
None
See application file for complete search history.

(56) References Cited

U.S. PATENT DOCUMENTS

| 3,934,743 A * | 1/1976 | McChesney et al. ......... 215/373 |
| 4,044,086 A | 8/1977 | McChesney et al. |
| 4,170,622 A | 10/1979 | Uhlig |
| 4,406,854 A * | 9/1983 | Yoshino .......................... 264/532 |
| 4,598,839 A | 7/1986 | Dombroski et al. |
| 5,224,614 A | 7/1993 | Bono et al. |
| 5,431,292 A | 7/1995 | Cutler et al. |
| 5,988,417 A | 11/1999 | Cheng et al. |
| 6,213,326 B1 | 4/2001 | Denner et al. |
| 6,497,333 B1 | 12/2002 | Ellis |
| 2001/0030163 A1 | 10/2001 | Rashid et al. |
| 2003/0039779 A1 | 2/2003 | Share et al. |
| 2003/0197019 A1 | 10/2003 | Jouin et al. |
| 2004/0091651 A1 | 5/2004 | Rule et al. |
| 2005/0077298 A1 | 4/2005 | Nomula |

FOREIGN PATENT DOCUMENTS

| CA | 2 517 760 | 9/2004 |
| EP | 0 186 154 A2 | 7/1986 |
| EP | 0 311 161 | 4/1989 |
| EP | 0 573 180 | 12/1993 |

(Continued)

*Primary Examiner* — Monica Huson
(74) *Attorney, Agent, or Firm* — Morriss O'Bryant Compagni, PC

(57) ABSTRACT

A parison is described, as also is a method for the production of plastics bottles, in particular PET bottles, this having a rigid, substantially elongate body (2), which has a base (5) at one of its ends. At its opposite end, the body (2) of the parison (1) adjoins a neck section (3) which has been provided with a pouring aperture (6) and which is separated from the body (2) via a radially protruding, flange-like support ring (4), and which has a parison shoulder (A) below the support ring (4). The parison (1) has an external diameter of from 17.4 mm to 21.4 mm measured at the transition of the body (2) to the base (5), its wall thickness at that point being from 3.4 mm to 4.4 mm. The parison (1) also has a wall thickness of from 1.4 mm to 2.2 mm at the parison shoulder (A). The external diameter of the parison shoulder (A) has been judged in such a way that its separation (d) from the blow molding wall (12) is from 1.2 mm to 3 mm when the parison (1) is inserted into the blow mold (10).

7 Claims, 1 Drawing Sheet

FOREIGN PATENT DOCUMENTS

| | | |
|---|---|---|
| EP | 1 034 910 A1 | 9/2000 |
| EP | 1 332 861 | 8/2003 |
| EP | 1 362 685 | 11/2003 |
| EP | 1 332 036 | 11/2006 |
| FR | 2 846 946 | 5/2004 |
| JP | 63 078705 | 4/1988 |
| JP | 03 136813 | 6/1991 |
| WO | WO 96/33062 | 10/1996 |
| WO | WO 97/22527 | 6/1997 |
| WO | WO 01/89940 A | 11/2001 |
| WO | WO 2006/027092 | 3/2006 |

\* cited by examiner

US 8,486,325 B2

PARISON AND METHOD FOR THE PRODUCTION OF PLASTIC BOTTLES

This application claims priority to PCT Patent Application No. PCDEP2006/008990 filed on Sep. 15, 2006, the entirety of which is incorporated by reference.

BACKGROUND

1. Field of the Invention

The invention relates to a parison for a plastic bottle, in particular, for PET bottles producible using a stretch-blow-molding process as indicated in the preamble of claim 1. The invention also relates to a method for producing a plastic bottle from a parison in a stretch-blow-molding process as indicated in the preamble of the independent method claim.

2. Background of the Invention

Containers typically used in the past composed of tinplate or nonferrous-metal plate, glass, or even ceramic, are increasingly being displaced by containers made of plastic. Particularly in the case of packaging of free-flowing media, for example, cleaning implements, toiletries, cosmetics, automotive media, etc., it is primarily plastic containers that are being employed. The low weight and low cost clearly play a not-insignificant role in this substitution. The use of recyclable plastics and the overall positive energy balance in their production also contribute to promoting the acceptance by consumers of plastic containers, in particular, plastic bottles.

The most frequently used plastic bottles are composed of polyethylene terephthalate or PET, or copolyesters thereof that have been slightly modified, and are produced using what is known as the stretch-blow-molding method. This method involves a combination of injection molding and blow molding. Here a parison is first produced in an injection mold using the injection molding process. Recently, extrusions methods have also been proposed for the goal of producing parisons. The parison has an essentially longitudinal cylindrical body, on the longitudinal end of which a base is formed. A support ring separates the body from a neck section with a pouring aperture. This neck section typically already has the subsequent form of the bottle neck. Generally, threaded sections or the like for attaching a closing component are also formed on the outside of this neck section. In a plastic injection-molding process, the parison is released from the injection mold after is it is produced, conditioned as required, and inserted into a blow mold of a blow-molding machine in which it is finally expanded by high pressure into the desired shape and then additionally stretched by a stretching core. An injection-blow-molding method is also already known in which the blowing process is affected directly following the injection-molding of the parison. Here the parison remains on the extrusion core and part of the injection mold forms a section of the blow mold.

In the stretch-blow-molding method for pure PET and slightly modified copolyesters thereof, primarily of isophthalic acid, certain stretch ratios have become established, where the design of the parison (blank) is typically defined by a longitudinal stretch ratio of 2 to 4, and a diametric stretch ratio of 2-5. The global stretch ratio, which is defined as the product of the two stretch ratios, generally ranges here between 6 and 14. It is well known that the transition between the non-stretched neck and the stretched body of the bottle represents a weak point since the material here stretches poorly. The result is that material is often wasted in this region, which is also known as a parison shoulder, due to unnecessary accumulations of material—an extremely undesirable factor in view of the cost of the material. The poorly-stretched material in the parison shoulder often has low temperature stability and compression-tension stability. In particular in the case of increased temperatures, this can result in skewed or distended necks and similar problems. Plastic bottles from the beverage industry are especially impacted by the described set of problems, the bottles being under internal pressure from nitrogen or carbon dioxide. However, even plastic bottles used in the aerosol industry are affected by this since after all these plastic bottles when in use are exposed to internal pressure from nitrogen, carbon dioxide, propane, butane, CFC, HFC, or mixtures of the referenced gases. These problems are especially prevalent in the case of plastic bottles having a fill volume of around 50 ml up to around 660 ml, and an internal pressure of 0.5 bar up to 5 bar at temperatures of 15° C. up to around 35° C.

The problem to be solved by this invention is thus to improve a parison for the production of plastic bottles, in particular, PET bottles, in a stretch blow molding method in a way so as to remedy the described problems. The goal is to prevent material wastage resulting from local material accumulations in light of scarce resources and increased environmental awareness. The goal is to prevent the weak points in the region of the parison shoulder. The goal is to create a parison that is able to be processed in known stretch blow molding equipment. The goal is to be able to use the finished stretch-blow-molded plastic bottle in a conventional manner in bottling equipment. The required mechanical strengths and thermal stabilities of the plastic bottle produced therefrom must continue to be ensured. The goal is for the parison to be producible by mass-production equipment in the injection-molding process, or also in an extrusion process.

SUMMARY OF THE INVENTION

The solution to these in part conflicting problems consists in a parison for plastic bottles producible in an stretch-blow-molding method, in particular, PET bottles, that have the features listed in the characterizing section of claim 1. Developments and/or advantageous embodiment-variants of the invention are covered in the dependent claims. The problems are also solved by a method for producing plastic bottles from a parison in a stretch-blow-molding process that has the process steps listed in the characterizing section of the independent method claim.

What is created by the invention is a parison for producing plastic bottles, in particular, PET bottles, that have a rigid essentially longitudinal body which has a base at its one longitudinal end. At its opposite longitudinal end, the body of the parison adjoins a neck section provided with a pouring aperture, which neck section is separated from the body by a radially protruding flange-like support ring, and has a parison shoulder below the support ring. At the transition from the body to the base, the parison has an outer diameter of 17.4 mm-21.4 mm and a wall thickness of 3.4 mm to 4.4 mm. In addition, at the parison shoulder the parison has a wall thickness of 1.4 mm-2.2 mm. The outer diameter at the parison shoulder is dimensioned such that it has a clearance from the blow mold wall measuring 1.2 mm-3 mm with the parison inserted into the blow mold.

The combination of features according to the invention provides an optimal longitudinal stretching of the parison shoulder. The parison shoulder comes into contact with the wall of the blow mold only after it has been sufficiently stretched. This enables undesirable accumulations of material to be prevented in the parison shoulder. This is because whenever the parison shoulder is too early in contacting the blow mold wall, the shoulder is cooled, the plastic solidifies and cannot be stretched any further in this region. The optimal stretching of the parison in the parison shoulder enables the plastic material to have the requisite stabilities in terms of temperature and compression-tension load. The combination of features according to the invention allow for global stretch ratios ranging between 8 and 16, all of which benefits the manufacturer in terms of significant degrees of freedom in shaping/molding the plastic bottles.

In view of the fact that the employed plastics in part significantly change their physical characteristics due to the stretching, the parison is designed for a longitudinal stretch ratio of 2-5. With these longitudinal ratios, it is possible to achieve the optimal characteristics for the plastics employed.

For purposes of the production of plastic bottles used in the beverage industry, the parison advantageously has an outer diameter of 24.2 mm-25.2 mm at the parison shoulder. Parisons for use in the aerosol industry advantageously have an outer diameter of 27.7 mm-28.7 mm at the parison shoulder. If the outer diameters for the wall thicknesses are greater or smaller than this at the parison shoulder, the parison contacts the blow mold wall too early and the plastic can no longer be stretched sufficiently. If outer diameters are too small in the region of the parison shoulder, there is a danger that the parison cannot be expanded sufficiently at this site. This can result in problems in systems that are attached downstream from the stretch blow molding equipment.

As to materials for the parison, PET or its copolyesters, in particular, of isophthalic acid, have proven to be very advantageous in terms of their mechanical, thermal, and chemical properties.

Plastic bottles that have been produced from a parison according to the invention in a stretch-blow-molding process also do not have any weak point at the transition from the bottle neck to the bottle body. Undesirable accumulations of material due to insufficient stretching are also prevented. The bottles also have sufficient thermal stability and high compression/tension stability at the transition. The problem of skewed or distended necks has been eliminated.

In the method according to the invention for producing plastic bottles in a stretch-blow-molding process, a parison is inserted in a blow mold, the parison comprising a rigid essentially longitudinal body that has a base at its one longitudinal end and adjoins at its opposite longitudinal end a neck section provided with a pouring aperture, which section is separated from the body by a radially protruding flange-like support ring and has a parison shoulder below the support ring, the parison then being stretched with a stretching core and expanded by high pressure in accordance with the mold cavity of the blow mold, and the finished plastic bottle is then released from the mold. The parison is inserted into the blow mold such that the parison shoulder has a clearance of 1.2 to 3 mm from the blow mold wall. In a first process step, the parison shoulder is stretched by the stretching core without bringing the parison shoulder into contact with the blow mold wall. Only in the following process step is the body of the parison stretched in terms of its length and its diameter.

The conduct of the method according to the invention enables the parison shoulder to be optimally stretched, thereby preventing accumulations of material. Also prevented are any weak points in the finished stretched-blown bottle at the transition from the neck to the bottle body. Due to the fact that the parison shoulder is stretched first without the parison shoulder's coming into contact with the blow mold wall from the preblow pressure, the parison maintains its full moldability. Partial solidification of the parison material in the contact region with the colder blow mold wall is prevented. The optimal stretching of the parison shoulder is prevented here by the clearance of the shoulder from the blow mold wall and by the mechanical dimensioning of the parison.

The process step of stretching the parison shoulder is affected at the usual stretching rates within the first 200 ms of the stretch-blow-molding process.

In order to achieve the desired global stretching, and thus the desired properties of the inserted plastic material, the parison is formed within the blow mold at a longitudinal stretch ratio of 2-5.

A parison is advantageously inserted into the blow mold, which parison at the transition from the body to the base has an outer diameter of 17.4 mm-21.4 mm and a wall thickness of 3.4 mm to 4.4 mm, and at the parison shoulder has a wall thickness of 1.4 mm-2.2 mm. In the case of larger or smaller wall thicknesses for the body of the parison, the parison body does not develop sufficient tensile force during longitudinal stretching by the stretching core to draw sufficient material from the parison shoulder. The tensile force of the parison body here is proportional to the cross-section to be stretched, which cross-section is determined by the wall thickness and by the outer diameter of the parison body. If the outer diameter is smaller, the tensile force drops below the requisite level. If the outer diameter is larger, the tensile force increases. This can result in an overstretching of the parison shoulder and in an undesirable change in color, usually towards the white.

For the purpose of producing plastic bottles for use in the beverage industry, the parison inserted into the blow mold advantageously generally has an outer diameter of 24.2 mm to 25.2 mm at the parison shoulder. For the purpose of producing plastic bottles that are used in the aerosol industry, parisons are inserted into the blow mold for which the parison shoulder has an outer diameter of 27.7 mm to 28.7 mm. If the outer diameter is larger, the parison touches the blow mold wall too early. The plastic material cools and can no longer be stretched to the desired extent. If the outer diameter is too small, the danger exists that the parison is not completely expanded in the region of the parison shoulder and that there will be problems with the dimensional stability of the stretch-blow-molded plastic bottle.

BRIEF DESCRIPTION OF THE DRAWINGS

Additional advantages and features are revealed in the following description of an embodiment of the invention with reference to the schematic drawings. In a manner not to scale.

DETAILED DESCRIPTION OF THE ILLUSTRATED EMBODIMENTS

Figure 1:
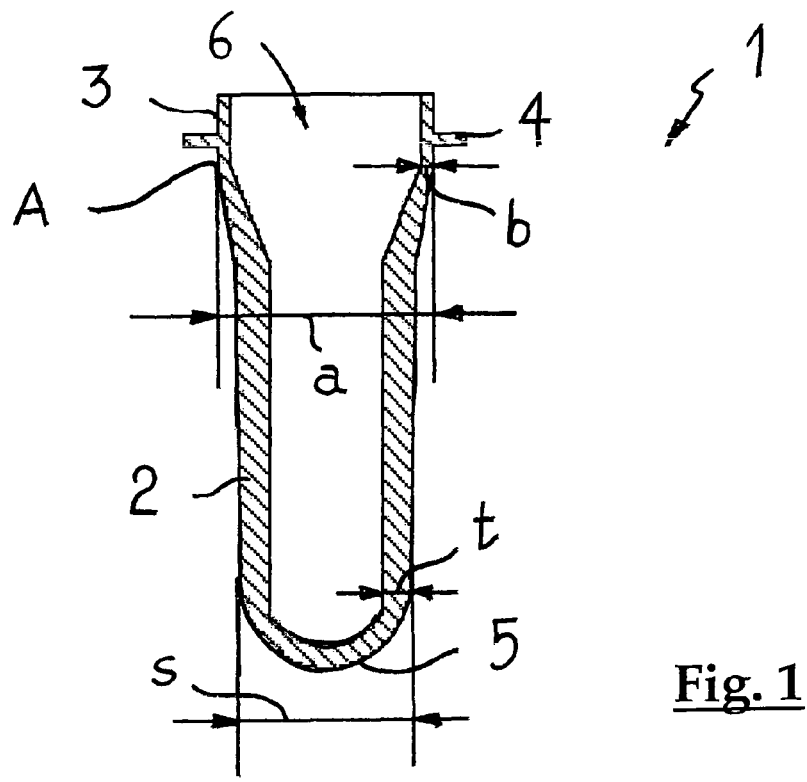
FIG. 1 shows an axial section of a parison.

An exemplary embodiment of the parison according to the invention is marked in FIG. 1 in its totality by reference number 1. Parison 1 is typically composed of PET or of copolyesters thereof, in particular, isophthalic acid. Parison 1 has a rigid, essentially longitudinal body 2 that has a base 5 at its longitudinal end. At its opposite longitudinal end, body 2 of parison 1 has a neck section 3 provided with a pouring aperture 6, which section is separated from body 2 by a radially protruding, flange-like support ring 4. Depiction of the threaded sections or the like that are formed on the neck section of parison 1 have been omitted for the sake of clarity. The parison has a parison shoulder A below support the support ring. Parison shoulder A is located on the outside of the parison 5 mm below support ring 4 and runs in annular fashion around parison 1. Parison 1 has an outer diameter s of 17.4 mm-21.4 mm as measured at the transition of body 2 to base 5. Its wall thickness at the transition measures 3.4 mm to 4.4 mm. At parison shoulder A, the parison has a wall thickness of 1.4 mm-2.2 mm. Outer diameter a at parison shoulder A measures 24.2 mm-252 mm in parisons for the production of bottles used in the beverage industry. For the production of plastic bottles used in the aerosol industry, outer diameter a of parison 1 is 27.7 mm-28.7 mm at the parison shoulder.

Parison 1 according to the invention allows for global stretch ratios of 8 to 16. The global stretch ratio here is defined as the product of the longitudinal stretch ratio and the diametric stretch ratio. According to the definition, the longitudinal stretch ratio is yielded by the ratio of the length of the stretch-blow-molded bottle to the length of the parison. The length of the bottle is provided by the developed length of the support ring up to the base of the bottle. Due to its greater wall thickness, the length of the parison is defined as the mean developed length of the support ring up to the base of the parison. The diametric stretch ratio is the product of the ratio of the outer diameter of the bottle to the outer diameter of the parison. Due to the relatively large wall thickness of the parison, the mean outer diameter is considered here to be the mean outer diameter at the transition from body 2 of parison 1 to base 5 of parison 1. The outer diameter of the bottle is considered to be the bottle's maximum outer diameter. Parison 1 according to the invention is designed to achieve longitudinal stretch ratios of 2-5.

Figure 2:
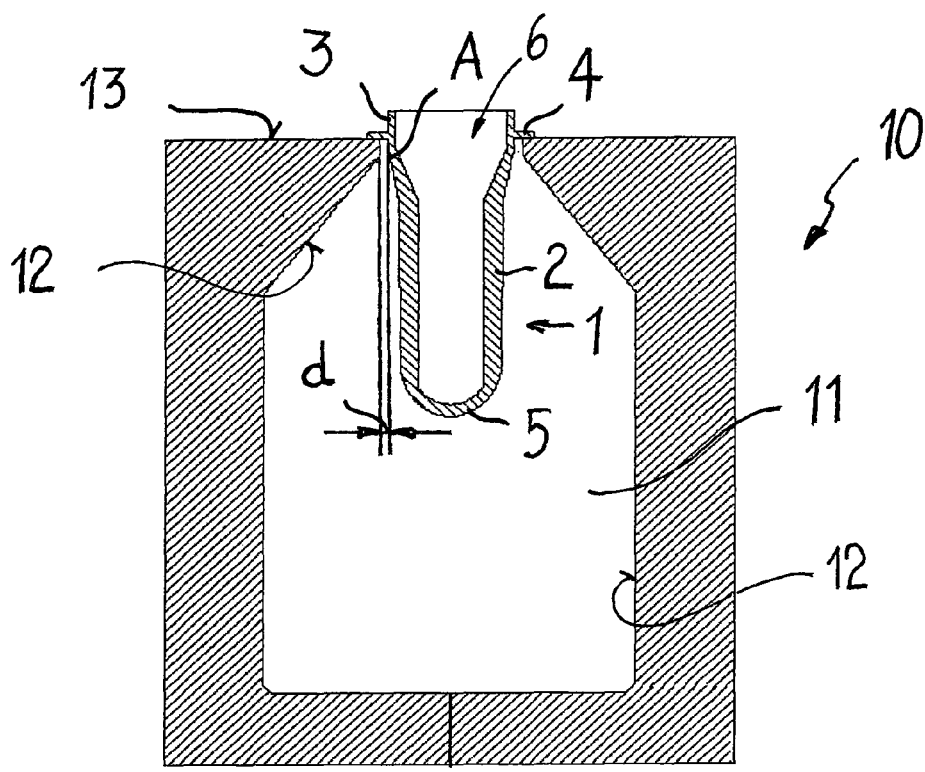
FIG. 2 is an axial sectional view of the parison of FIG. 1 when inserted into a blow mold.

FIG. 2 shows parison 1 inserted into blow mold 10. Here identical elements of parison 1 are marked with identical reference notations. Blow mold 10 is composed, for example, by two blow mold halves, the blow mold walls 12 of which delimit a mold cavity 11 when in the closed state. Body 2 of parison 1 projects into blow mold cavity 11. Here parison 1 is supported by support ring 4 on the top side 13 of blow mold 10. Parison 1 is inserted into blow mold 10 in such a way that parison shoulder A has a clearance, identified by reference notation d, relative to blow mold wall 12, which clearance measures 1.2 mm-3 mm.

Combined with outer diameter s of the parison and wall thicknesses b, t at parison shoulder A and at the transition of body 2 to base 5, the clearance of parison shoulder A ensures optimal stretching of the parison at parison shoulder A. Here parison shoulder A is first stretched without the shoulder's coming into contact with blow mold wall 12 at the typical, for stretch blow molding, feed rates of the stretching core within the first 200 ms. During the longitudinal stretching, the dimensioning of parison 1 ensures that sufficiently great tensile force is applied to parison shoulder A so that sufficient material is drawn off there. Based on the dimensioning according to the invention of parison 1, the longitudinal stretching and diametrical stretching of body 2 of parison 1 is affected immediately following the longitudinal stretching of parison shoulder A. Only in this following process step in which parison 1 is completely expanded by the blowing pressure does parison shoulder A come into contact with blow mold wall 12 so as to cool sufficiently such that the plastic material solidifies. Finally, the finished blow-molded plastic bottle is released from the mold.

The parison according to the invention and the conduct of the method according to the invention in the stretch-blow-molding process provide optimal longitudinal stretching of parison shoulder. The parison shoulder comes into contact with the blow mold wall only after it has been stretched sufficiently. This enables undesirable accumulations of material in the parison shoulder to be prevented. Due to the optimal stretching of the parison in the parison shoulder, the plastic material has the requisite stabilities in terms of temperature and compression/tension load. The combination of features according to the invention allow for global stretch ratios ranging between 8 and 16, all of which provides the manufacturer significant degrees of freedom in terms of shaping/molding the plastic bottles.

What is claimed is:

1. A method of producing a plastic bottle in a stretch-blow-molding process, comprising:
    inserting a parison into a blow mold having a blow mold wall, the parison comprising a rigid, essentially longitudinal body that has a base at one longitudinal end and a neck section provided with a pouring aperture at an opposite longitudinal end, the neck section separated from the body by a radially protruding flange-like support ring and a parison shoulder, the parison inserted in the blow mold in such a way that the parison shoulder has a clearance of 1.2 to 3 mm from the blow mold wall;
    stretching the parison with a stretching core;
    expanding the parison by high pressure in accordance with the mold cavity of the blow mold to stretch the length and diameter of the body of the parison without bringing the parison shoulder into contact with the blow mold wall; and
    releasing the finished plastic bottle from the mold.

2. The method of claim 1, wherein the stretching comprises stretching the parison shoulder within the first 200 ms of a stretch-blow-molding process.

3. The method of claim 1, wherein the stretching comprises stretching the parison within the blow mold at a longitudinal stretch ratio of 2-5.

4. The method of claim 1, further comprising inserting the parison into the blow mold, wherein the parison has an outer diameter of 17.4 mm to 21.4 mm and a wall thickness of 3.4 mm to 4.4 mm at the transition from the body to the base and a wall thickness of 1.4 mm to 2.2 mm at the parison shoulder.

5. The method of claim 4, further comprising inserting the parison into the blow mold wherein the parison shoulder has an outer diameter measuring 24.2 mm to 25.2 mm.

6. The method of claim 4, further comprising inserting the parison into the blow mold, wherein the parison shoulder has an outer diameter measuring 27.7 mm to 28.7 mm.

7. The method of one of claim 1, further comprising inserting the parison into the blow mold, wherein the parison is comprised of PET, copolyesters of PET or isophthalic acid.

* * * * *